United States Patent [19]

Stahl

[11] 4,028,915
[45] June 14, 1977

[54] LEVER ARM LOCK FOR QUICK RELEASE HUB ASSEMBLY

[75] Inventor: Michael A. Stahl, Miami Beach, Fla.

[73] Assignee: Far Out Products Ltd., Hollywood, Fla.

[22] Filed: Feb. 17, 1976

[21] Appl. No.: 658,541

[52] U.S. Cl. .................... 70/233; 70/210; 70/DIG. 26; 70/DIG. 31; 70/DIG. 58; 280/279
[51] Int. Cl.$^2$ .................. B62K 25/00; B62K 25/02
[58] Field of Search ..... 70/259, 233, 236, DIG. 26, 70/DIG. 31, DIG. 58, 202, 203, 204, 210, 226; 280/279

[56] References Cited
UNITED STATES PATENTS

| | | | |
|---|---|---|---|
| 1,501,934 | 7/1924 | Wise | 70/211 |
| 2,350,633 | 6/1944 | Obenauer | 70/232 |
| 2,677,984 | 5/1954 | Juy | 280/288 X |
| 3,610,659 | 10/1971 | Gerarde | 280/279 |
| 3,807,761 | 4/1974 | Brilando | 280/279 |

FOREIGN PATENTS OR APPLICATIONS 454,468  6/1950  Italy ..................... 70/226

Primary Examiner—J. Franklin Foss
Attorney, Agent, or Firm—Lowe, King, Price & Markva

[57] ABSTRACT

A lever arm lock for a conventional quick-release hub assembly includes a cover mountable to a first skewer rod end nut supporting a quick-release lever arm. The cover is secured to the end nut with a locking mechanism (combination, magnetic, key, etc.) and maintains the lever arm in a locked position making it impossible to remove the hub. A second skewer rod end nut opposite the first end nut is formed with a substantially smooth outer surface that is continuously inclined with respect to the axle. This surface configuration prevents removal of the locked hub assembly by turning the second end nut with a pliers or other tool. The lever arm lock also prevents the hub from being jarred loose on impact with curbs, rocks, etc. The end nut assemblies have extensions which abut the frame thereby preventing loosening thereof for unauthorized removal.

19 Claims, 13 Drawing Figures

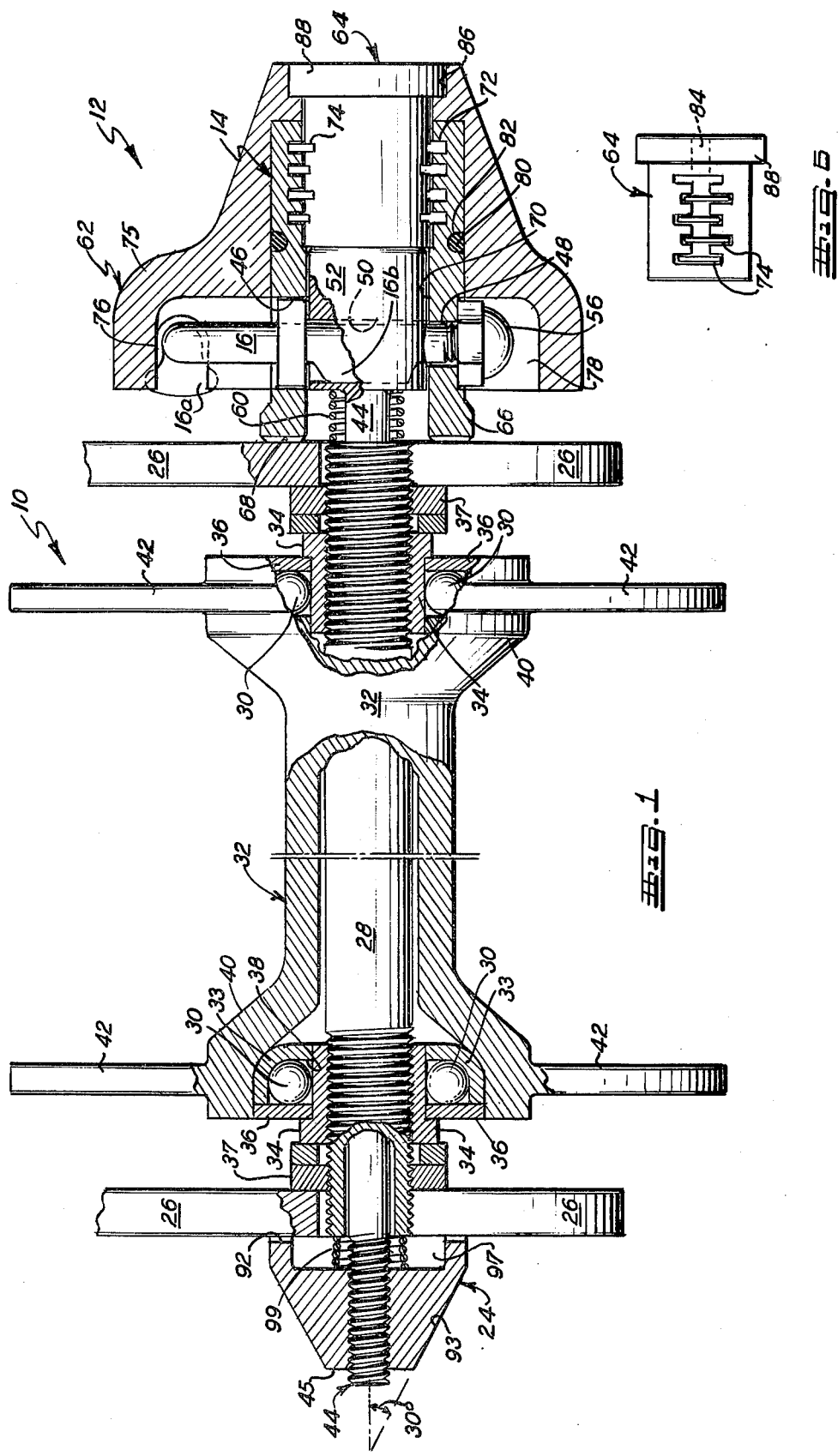

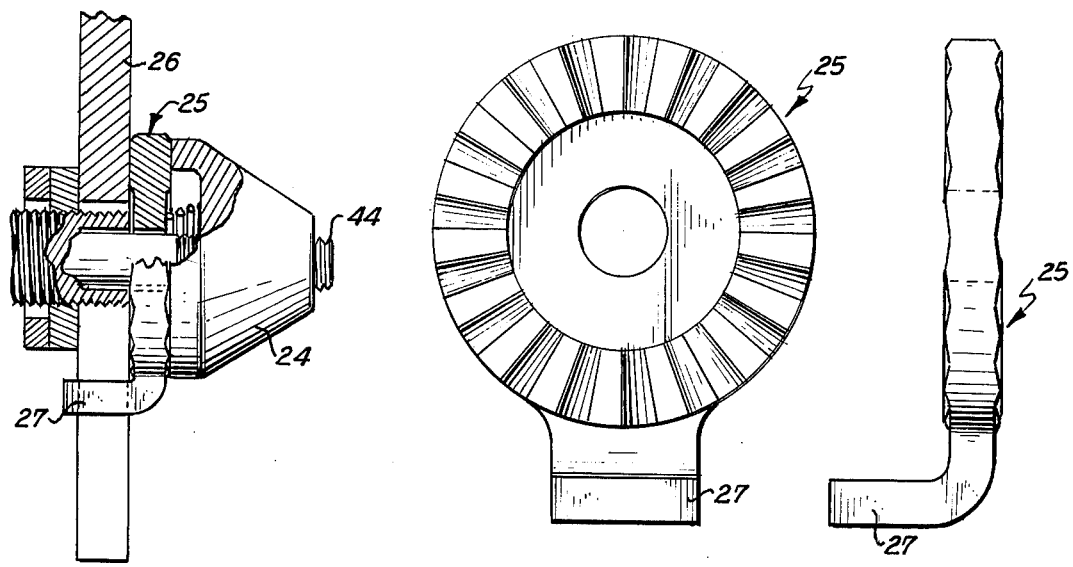
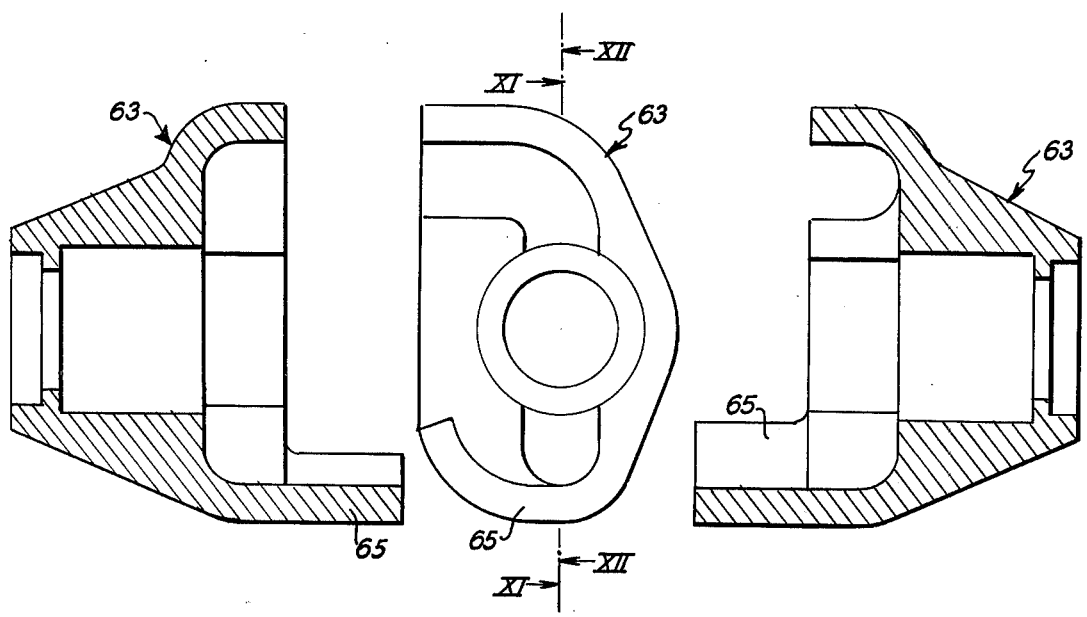

LEVER ARM LOCK FOR QUICK RELEASE HUB ASSEMBLY

BACKGROUND OF THE INVENTION

The present invention relates generally to quick-release hubs of the lever arm type, and more particularly, to a protective attachment for maintaining the lever arm in the locked position.

Today, most 10-speed bicycles are equipped with quick-release hub assemblies to permit rapid removal of the front and rear wheels. Either wheel, but commonly only the front wheel, is often removed from the bicycle during longterm storage, or to conserve space, when the bicycle is being transported. In addition, to reduce the likelihood of theft, at least the front wheel of a bicycle having quick-release hubs is typically removed before the bicycle is chained to a bicycle rack. However, there still remains a possibility of having the front or rear wheel stolen, particularly when the chain is not threaded through each wheel as well as the frame. In such a case, a thief need only flip the lever arm of a hub to remove the wheel.

Quick-release hubs are often not tightened properly when they are installed. The hubs can be jarred loose from the bicycle frame on impact with obstructions in the road, e.g., curbs, rocks, etc., causing accidents.

PURPOSE OF THE INVENTION

The primary object of the invention is to provide a device for preventing unauthorized removal of a wheel from a vehicle.

Another object of the invention is to provide a device for preventing unauthorized removal of a bicycle wheel having a quick-release hub assembly.

A further object of the invention is to provide an attachment for maintaining the lever arm in a quick-release hub assembly in the locked position thereby preventing unauthorized removal of the wheel by an individual or on impact with objects such as curbs, etc.

Another object of the invention is to provide a quick-release hub assembly for a bicycle which cannot be defeated by removing a skewer rod end nut when the quick-release lever arm is in the locked position.

Yet another object of the invention is to provide a new and improved quick-release bicycle hub assembly including a device for preventing unauthorized operation of the quick-release lever arm or removal of the skewer rod end nuts.

A still further object of the invention is to provide a new and improved bicycle quick-release hub assembly having a locking mechanism attachment for securing the position of the lever arm to prevent unauthorized removal of the wheel, or by loosening on impact.

SUMMARY OF THE INVENTION

In accordance with the invention as described herein, a quick-release hub assembly has a quick release lever arm for selectively securing or releasing a wheel hub with respect to the legs of a wheel mounting fork. A protective assembly includes a cover member for maintaining the lever arm in a locked position to prevent unauthorized removal of the wheel or jarring loose of the wheel on impact with curbs, etc. The cover must be removed to move the lever arm to an unlocked position for releasing the hub.

The quick-release hub assembly itself is well known and comprises a wheel hub rotatably mounted on a hollow axle. A skewer rod is contained within the axle and freely movable therein. First and second end nuts are located respectively at opposite threaded end portions of the rod. The hub receives the legs of a bicycle wheel mounting fork between the nuts. An eccentric stem portion of the lever arm extends radially through the first end nut and skewer rod such that rotation of the lever arm controls the location of the first end nut on the skewer rod. When the lever arm is in the locked position, the legs of the wheel mounting fork is secured between the end nuts and hub. The distance between the end nuts in the locked position is adjusted by rotating the second end nut on the corresponding threaded end portion of the skewer rod. With the lever arm in the released position, the distance between the end nuts is large enough to release the legs of the wheel mounting fork.

The cover member is adapted to slip over the first end nut into contact with the lever arm. A locking mechanism is inserted in an axial bore of the end nut and secures the cover member in place. Spring-loaded pins contained in the locking mechanism engage corresponding grooves formed in the inner surface of the bore. The cover includes a channel which fits over the lever arm in the locked position. Thus, it is impossible to operate or jar loose the lever arm.

The second end nut has a substantially smoother outer surface that is continuously inclined toward the axle to prevent gripping the nut with a pliers or other tool. This prohibits removal of the wheel by removing the second end nut from the skewer rod when the hub assembly is locked.

A further feature of the invention is directed to the use of abutment means operating in conjunction with the end nuts. A wedge clip having a projection abutting the bicycle frame prevents the rotating of the second end nut used in conjunction therewith. At the other end of the hub assembly, the cover member includes an extension or projection constituting an abutment means for contact with the bicycle frame. The abutment means in both situations prevents the counter-clockwise rotation of the total assembly thereby loosening the assembly for effecting unauthorized removal thereof.

BRIEF DESCRIPTION OF THE DRAWINGS

Other objects of this invention will appear in the following description and appended claims, reference being made to the accompanying drawings forming a part of the specification wherein like reference characters designate corresponding parts in the several views.

FIG. 1 is a side elevational view, partly in cross-section, showing a quick-release hub assembly incorporating the present invention;

FIG. 6 is a detailed top plan view of the locking mechanism;

FIG. 7 is a fragmentary view, partially in longitudinal cross-section of another embodiment of the second end nut used with a wedge clip;

FIG. 8 is a side elevational view of a wedge clip made in accordance with this invention;

FIG. 9 is a side elevational view of the wedge clip shown in FIG. 8;

FIG. 10 is a side elevational view of another embodiment of a quick-release lever cover made in accordance with this invention;

FIG. 11 is a cross-sectional view of the quick-release cover taken along line XI — XI; and FIG. 12 is a cross-sectional view taken along line XII — XII of FIG. 10.

Referring to FIG. 1, a conventional quick-release hub assembly 10 for a bicycle, such as the American Cycles System, Inc. Model 500 quick-release hub is shown. In accordance with the invention, a lever arm locking assembly 12 is attached at one end of hub 32 for maintaining quick-release lever arm 16 in a locked position. A special second end nut 24 disposed at the opposite end of hub 32 cannot be removed when assembly 10 is secured to wheel mounting legs 26 of a bicycle frame.

Figure 5:
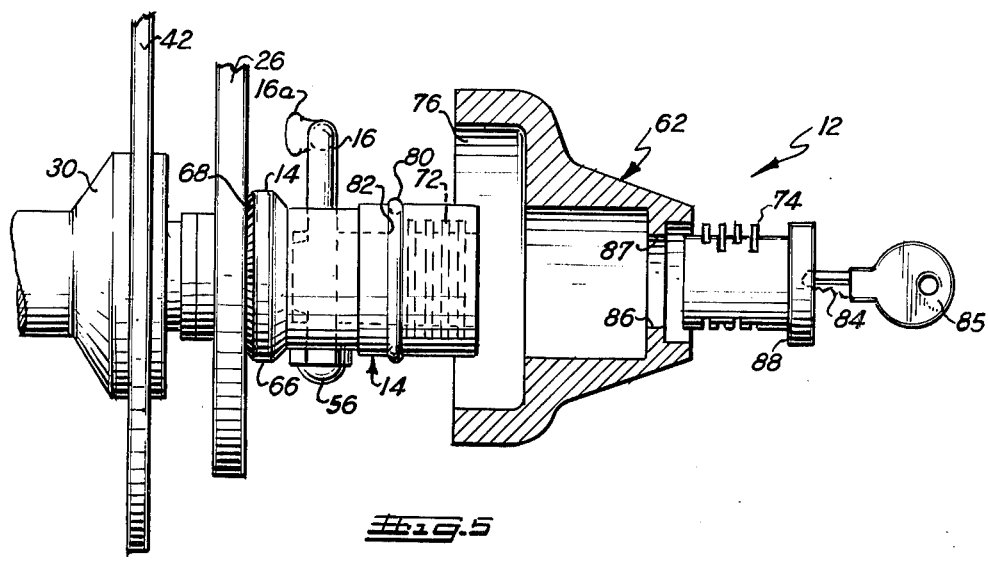
FIG. 5 is an exploded view, partly in cross-section, of the quick-release lever cover and locking mechanism shown in FIG. 1.

Hub assembly 10 comprises a hollow bicycle axle 28 supported by conventional anti-friction ball bearings 30 in turn supporting hub 32. At each end of hub 32, a threaded cone member 34 is applied to axle 28. Washer 36 holds bearing balls 30 against inner race 38 of cup 33. Bell portion 40 of hub 32 has an annular flange 42 to accommodate the inner ends of wheel spokes (not shown) used in constructing the wheel.

A skewer rod 44 located within the hollow axle 28 is freely movable and extends beyond axle 28 at each end thereof. One end of skewer rod 44 is externally threaded to receive threaded end nut 24. The opposite end of rod 44 includes a skewer piston 52 (FIG. 1) fitting into end nut 14. End nuts 14 and 24 are spaced from hub 32 and secured against legs 26 maintaining legs 26 against jam nuts 37.

Quick-release lever arm 16 includes a curved thumb-and-forefinger grip 16a and an eccentric stem portion 16b (FIG. 1). Stem portion 16b extends through apertures 46 and 48 formed in end nut 14 as well as through apertures 50 in piston 52. As lever arm 16 is rotated, eccentric stem portion 16b moves piston 52 and, consequently, causes rod 44 to slide longitudinally within axle 28. This quick-release mechanism is typically found in the prior art.

Figure 2A:
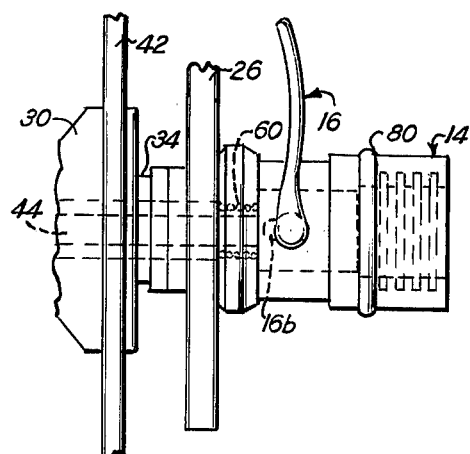
FIGS. 2A and 2B are fragmentary elevational views of the hub assembly of FIG. 1 illustrating the operation of the quick-release lever arm.
Figure 2B:
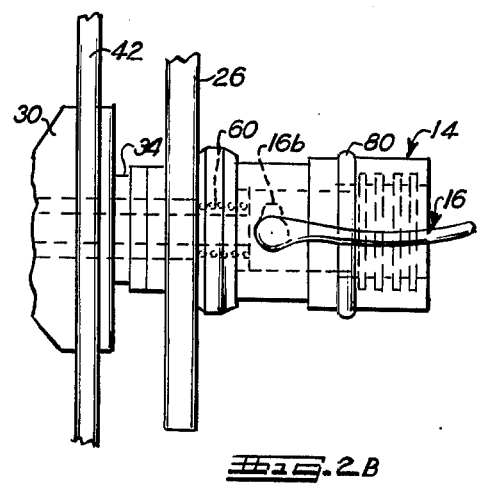

Referring to FIGS. 2A and 5, as lever arm 16 is rotated toward a first locked position aligned to flange 42, the eccentric portion 16b (FIG. 1) causes end nut 14 to shift to the left toward axle 28 against the force of spring 60. Leg 26 of a wheel mounting fork is secured on axle 28 between end nut 14 and jam nut 37 when arm 16 is in the locked position. Referring to FIG. 2B, when lever arm 16 is rotated away from hub 32 to a second released position, eccentric portion 16b, assisted by spring 60, draws end nut 14 away from hub 32 for releasing leg 26.

In accordance with the invention, lever arm lock assembly 12 comprises a shroud or cover member 62 mounted to end nut 14 and secured thereto by locking mechanism 64. When in position on nut 14, cover 62 maintains the lever arm 16 in the locked position, as shown in FIG. 1. End nut 14 has a cylindrical portion and an annular flange 66 at one end thereof. Knurled nut end face 63 bites into a leg 26 to secure hub assembly 10 to the wheel mounting fork of a bicycle. As noted, eccentric portion 16b of lever arm 16 extends through nut 14 at apertures 46 and 48 and through piston 52 at aperture 50. Nut 56 is attached to the lower end of eccentric 16b to retain lever arm 16 to end nut 14.

End nut bore 70 has a smooth inner surface in the left-hand portion thereof to permit free movement of piston 52 received therein. A series of annular grooves 72 is formed along the bore surface in the right-hand portion to mate with pins 74 of conventional locking mechanism 64 which is inserted in bore 70.

Figure 3:
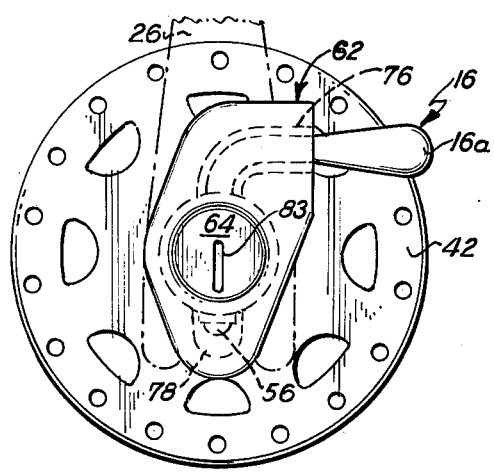
FIG. 3 is an end elevational view of the assembly of FIG. 1 showing the quick-release lever arm, cover and locking mechanism.

When cover member 62 is mounted to end nut 14, the upper portion 74 extends to lever arm 16 just adjacent leg 26 (FIG. 1). Lever arm 16 is seated within channel 76 and nut 56 is seated in channel 78 (see FIGS. 3 and 5). An elastic O-ring 80 is disposed in an annular recess 82 formed in the outer surface of end nut 14 prevent any rattling of cover 62 when secured thereto.

As noted above, cover 62 is secured by inserting locking mechanism 64 into bore 70 of end nut 14. Referring to FIGS. 5 and 6, locking mechanism 64 is a conventional locking plug unit having a series of spring-loaded (springs not shown for simplicity) wafer pins 74 which are coded. Pins 74 are drawn down into the body of the locking mechanism 64 when the proper key 85 is inserted. The head 88 of locking mechanism 64 is enlarged to seat against annular internal lip 86 in cover 62.

In use, key 85 is inserted into slot 83 (FIG. 3) causing teeth 84 to retract wafer pins 74 down into mechanism 64. Thus, mechanism 64 can be passed through aperture 87 of cover 62 and mated with end nut 14. Then, as key 85 is removed, the spring biased pins 74 pop-up from the body of locking mechanism 64 and engage with grooves 72 locking the mechanism to end nut 14. To remove cover 62, key 85 is re-inserted into slot 83 to draw back wafer pins 74 so that the mechanism can be withdrawn. It is not necessary to rotate mechanism 64 during either insertion or removal with respect to end nut 14.

Figure 4:
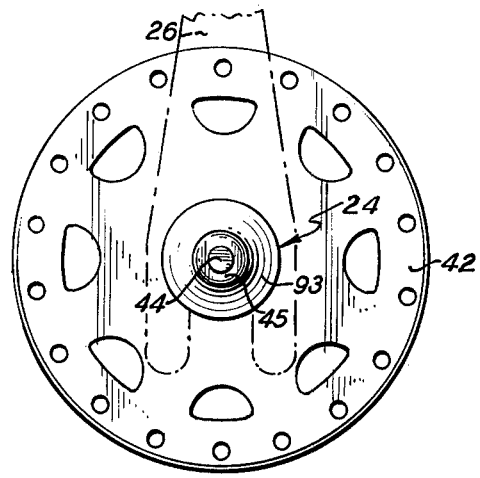
FIG. 4 is another end elevational view of the assembly of FIG. 1 showing the second end nut.

For a discussion of another feature of the invention, refer to FIGS. 1 and 4. Second end nut 24 is threaded to skewer rod 44 at the end opposite end nut 14. End nut 24 contains a smooth outer surface 93 that is continuously inclined along an angle of about 30 degrees with respect to skewer rod 44. Knurled end face 92 bites into a leg 26 to secure hub assembly 10 to the wheel mounting fork of a bicycle. End face 92 also includes a recess 97 for seating a spring 99 which abuts the end of axle 28. The substantially smooth, continuously inclined outer surface 92 has a configuration which cannot be engaged by a pliers, or the like. Consequently, the wheel cannot be removed when lever arm 16 is locked in place with assembly 12. End nut 24 is chamfered to prevent injury or damage by the tip 45, but the chamfered portion is too small (approximately one-tenth of an inch) to permit gripping the nut thereat.

Further embodiments of the invention setting forth other features thereof are shown in FIGS. 7 through 12. There is a potential problem of spinning the locking end nut 24 in a counter-clockwise direction thereby loosening it for an unauthorized removal. Consequently, a wedge clip 25 having an extension 27 is placed between the leg 26 and the end nut 24 as shown in FIG. 7. Wedge clip 25 is knurled to bite into both the leg 26 and the end face of nut 24. Extension 27 fits into the same opening of leg 26 through which the axle 44 extends. Movement of the assembly as shown in FIG. 7 is thereby limited because extension or projection 27 abuts against the leg 26 as shown.

At the other end of the axle rod 44, the cover member 63 as shown in FIGS. 10–12 is used in the assembly 12. Cover member 13 includes an extension portion or projection 65 which abuts the bicycle frame whenever an attempt is made to rotate assembly 12 in a counter-clockwise direction to loosen it for unauthorized removal. That is, assembly 12 with projection 65 can be rotated only a very limited distance until it abuts the bicycle frame member. Projection 65 is disposed as close to the frame as possible when cover member 63 is placed over lever arm 16 for the purpose of maintaining the locking mechanism in place on the bicycle frame.

While a lever arm lock for a quick-release hub assembly has been shown and described in detail, it is obvious that this invention is not to be considered as being limited to the exact form disclosed, and that changes in detail and construction may be made therein within the scope of the invention, without departing from the spirit thereof. For example, although locking mechanism 64 is described as being a key-operated locking plug, obviously, other locking mechanisms can be used, e.g., combination, magnetic, etc.

Having thus set forth and disclosed the nature of this invention, what is claimed is:

1. The combination comprising:
   a. a quick release mechanism for releasably securing a hub assembly to a vehicle frame member;
   b. said mechanism including a lever arm movable between a first position for securing said hub with respect to said frame member and a second position for releasing said hub with respect to said frame member;
   c. locking means detachably securable to said mechanism for locking said lever arm in said first position;
   d. said hub assembly includes a hub rotatably mounted on an axle;
   e. first and second end nuts being located respectively adjacent opposite ends of said axle and spaced apart from said hub for receiving said frame member;
   f. said lever arm being operative to adjust a distance between said end nuts; and
   g. said locking means is securable to said first end nut with said hub being effective to rotate on said axle.

2. The combination as defined in claim 1 wherein said locking means includes a cover member for maintaining said lever arm in the first position when said cover member is secured to said first end nut.

3. The combination as claimed in claim 2 wherein said cover member includes a projection means which abuts the vehicle frame to prevent rotating of the locking means about said axle.

4. The combination as defined in claim 2 wherein said cover member includes channel means for seating against said lever arm when said cover is secured to said first nut and said lever arm is in the first position.

5. The combination as defined in claim 1 wherein said second end nut has substantially an entire outer surface inclined toward a central axis to prevent a gripping of said second end nut for removal thereof when said hub is secured with respect to said frame member.

6. The combination as defined in claim 5 wherein said outer surface of said second end nut is inclined at approximately 30° with respect to the central axis.

7. The combination as defined in claim 5 wherein a wedge clip having a projection means is disposed between the second end nut and the frame member, said projection means abutting said frame member to prevent rotating of the second end nut about said central axis.

8. The combination comprising:
   a. a quick release mechanism for releasably securing a hub assembly to a vehicle frame member;
   b. said mechanism including a lever arm movable between a first position for securing said hub with respect to said frame member and a second position for releasing said hub with respect to said frame member; and
   c. means securable to said mechanism for locking said lever arm in said first position;
   d. said hub assembly including a hub rotatably mounted on an axle;
   e. first and second end nuts being located respectively adjacent opposite ends of said axle and spaced apart from said hub for receiving said frame member;
   f. said lever arm being operative to adjust a distance between said end nuts;
   g. said locking means being securable to said first end nut;
   h. said locking means including a cover member for maintaining said lever arm in the first position when said cover member is secured to said first end nut;
   i. said first end nut includes an axial bore and being effective to support the cover member;
   j. said locking means including a locking plug insertable in said bore and means for retaining said plug within said bore;
   k. said plug being effective to secure said cover member to said first end nut.

9. The combination as defined in claim 8 wherein said cover member includes an extended portion to abut against and maintain said lever arm in a locked position when said cover member is assembled to said first end nut.

10. The combination comprising:
    a. a quick release mechanism for releasably securing a hub assembly to a vehicle frame member;
    b. said mechanism including a lever arm movable between a first position for securing said hub with respect to said frame member and a second position for releasing said hub with respect to said frame member; and
    c. means securable to said mechanism for locking said lever arm in said first position;
    d. said hub assembly including a hub rotatably mounted on an axle;
    e. first and second end nuts being located respectively adjacent opposite ends of said axle and spaced apart from said hub for receiving said frame member;
    f. said lever arm being operative to adjust a distance between said end nuts;

g. said locking means being securable to said first end nut;

h. said locking means including a cover member for maintaining said lever arm in the first position when said cover member is secured to said first end nut;

i. packing means is disposed between an outer surface of said first end nut and said cover member to prevent rattling thereof.

11. The combination as defined in claim 10 wherein said first end nut includes an annular recess formed in the outer surface thereof; and said packing means includes an elastic O-ring disposed in said recess.

12. A quick-release mechanism for releasably attaching a wheel hub assembly to a vehicle frame member, said mechanism comprising;

a. an axle and a hub mounted to said axle, b. first and second end nuts attached to respective opposite ends of said axle and being spaced apart from said hub for receiving said frame member between said end nuts and said hub, c. lever arm means for adjusting a separation of said end nuts for selectively securing and releasing said wheel hub assembly with respect to said frame member, d. substantially an entire outer surface of at least one of said end nuts being continuously inclined toward a center axis to prevent a gripping of said nut for removal thereof when said hub assembly is secured with respect to said frame member, and e. wedge clip means being disposed between said at least one end nut and having projection means abutting the frame member to prevent rotation about said center clip.

13. A quick-release mechanism for securing a wheel hub assembly to a vehicle frame member, said mechanism comprising;

a. an axle and a hub rotatably mounted to said axle, b. a lever arm movable between a first position and a second position, c. means controlled by said lever arm for selectively securing of releasing said hub assembly with respect to said frame member, d. said hub assembly being secured to said frame member with said lever arm in the first position and being released from said frame member with said lever arm in the second position, and e. means for locking said lever arm in the first position while said hub is effective to rotate about said axle.

14. The mechanism as defined in claim 13 wherein a skewer rod is movably contained within said axle, first and second end nuts are attached to respective opposite ends of said skewer rod and spaced apart from said hub to receive said frame member between said end nuts and said hub, said lever arm controlling an amount of separation of said first and second end nuts, said frame member being secured between said nuts and said hub when said lever arm is in the first position.

15. The mechanism as defined in claim 14 wherein said second end nut has substantially an entire outer surface inclined toward a center axis to prevent a gripping of said second end nut for removal thereof when said hub is secured with respect to said frame member.

16. The mechanism as defined in claim 13 wherein said locking means includes a cover member mountable in contact with said lever arm to fix the lever arm in said first position.

17. A quick-release mechanism for securing a wheel assembly to a vehicle frame member, said mechanism comprising:

a. an axle and a hub mounted to said axle, b. a lever arm movable between a first position and a second position, c. means controlled by said lever arm for selectively securing or releasing said hub assembly with respect to said frame member, d. said hub assembly being secured to said frame member with said lever arm in the first position and being released from said frame member with said lever arm in the second position.

e. means for locking said lever arm in the first position, f. the first end nut having an elongated portion, and g. said locking means including a cover member disposed on said elongated portion and in contact with said lever arm.

18. The mechanism as defined in claim 17 wherein said cover member includes projection means which abuts the vehicle frame to prevent rotating of said locking means about said axle.

19. The mechanism as defined in claim 18 wherein an inner surface of said cover member has a channel formed therein, said lever arm seating within said channel when said lever arm is in the first position and said cover member is disposed on said elongated portion.

* * * * *